(12) United States Patent
Boss et al.

(10) Patent No.: US 9,224,178 B2
(45) Date of Patent: Dec. 29, 2015

(54) DYNAMIC NEGOTIATION AND AUTHORIZATION SYSTEM TO RECORD RIGHTS-MANAGED CONTENT

(71) Applicant: International Business Machines Corporation, Armonk, NY (US)

(72) Inventors: Gregory J. Boss, Saginaw, MI (US); James R. Kozloski, New Fairfield, CT (US); Clifford A. Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 13/706,092

(22) Filed: Dec. 5, 2012

(65) Prior Publication Data

US 2014/0156044 A1  Jun. 5, 2014

(51) Int. Cl.
*G06F 21/00* (2013.01)
*G06F 21/10* (2013.01)
*G06Q 50/18* (2012.01)
*G06F 17/00* (2006.01)
*H04L 29/06* (2006.01)
*H04N 1/00* (2006.01)
*H04N 1/32* (2006.01)
*H04N 101/00* (2006.01)

(52) U.S. Cl.
CPC .............. *G06Q 50/184* (2013.01); *G06F 17/00* (2013.01); *G06F 21/10* (2013.01); *H04L 63/10* (2013.01); *H04N 1/00342* (2013.01); *H04N 1/32106* (2013.01); *H04N 2101/00* (2013.01); *H04N 2201/0084* (2013.01); *H04N 2201/3225* (2013.01); *H04N 2201/3278* (2013.01)

(58) Field of Classification Search
CPC .......................... H04L 2463/101; G06F 21/10
See application file for complete search history.

(56) References Cited

U.S. PATENT DOCUMENTS

| | | | |
|---|---|---|---|
| 6,608,649 | B2 | 8/2003 | Suzuki et al. |
| 7,533,417 | B2 | 5/2009 | Belz |
| 7,987,140 | B2 | 7/2011 | Bellwood et al. |
| 2003/0037010 | A1* | 2/2003 | Schmelzer ...................... 705/67 |
| 2006/0215026 | A1 | 9/2006 | Kamata et al. |
| 2009/0217343 | A1* | 8/2009 | Bellwood et al. ................ 726/1 |
| 2010/0082448 | A1* | 4/2010 | Lin et al. .......................... 705/26 |

(Continued)

FOREIGN PATENT DOCUMENTS

WO     2011147089 A1   12/2011

OTHER PUBLICATIONS

International Search Report for corresponding PCT Application No. PCT/US13/66344, dated Apr. 16, 2014, pp. 1-5.

(Continued)

*Primary Examiner* — Curtis Kuntz
*Assistant Examiner* — Thomas Maung
(74) *Attorney, Agent, or Firm* — Cantor Colburn LLP; Vazken Alexanian

(57) ABSTRACT

A content recording system comprises a digital media recording device to record content. A rights-management module is in electrical communication with the digital media recording device to detect a desired recording performed by the digital media recording device. The rights-management module further communicates digital rights information of a rights-managed content to the digital recording device. The recording of the rights-managed content is performed according to the digital rights information.

16 Claims, 8 Drawing Sheets

(56) References Cited

U.S. PATENT DOCUMENTS

| | | |
|---|---|---|
| 2010/0141778 A1 | 6/2010 | Basson et al. |
| 2010/0319064 A1 | 12/2010 | Warrier |
| 2011/0029884 A1 | 2/2011 | Grosz et al. |
| 2011/0210962 A1 | 9/2011 | Horan et al. |
| 2011/0289601 A1 | 11/2011 | Bellwood et al. |
| 2013/0166492 A1 | 6/2013 | Tardelli et al. |

OTHER PUBLICATIONS

Written Opinion for corresponding PCT Application No. PCT/US13/66344, dated Apr. 16, 2014, pp. 1-9.

* cited by examiner

DYNAMIC NEGOTIATION AND AUTHORIZATION SYSTEM TO RECORD RIGHTS-MANAGED CONTENT

BACKGROUND

The embodiments generally relate to recordation of rights-managed content, and more specifically, to negotiating and authorizing digital recordings of rights-managed content.

With rights-managed content, the right to use and/or obtain the image is typically restricted, often with limitations. For example, some content works, i.e., content, require payment of a royalty fee in exchange for a licensing agreement authorizing particular terms of use. Other content may be obtained for free. Nevertheless, the free content may include terms and conditions that users must comply with, such as limitations on duration of use, distribution, geographic region usage, industry usage, etc., as established by the licensing agreement.

A user might want to record desired content, for example by photographing an object or recording a sound, while also desiring to comply with any unknown copyright terms of the content. For example, a user may encounter a subject, object, sound, etc. that they would like to record, but may not be aware of the terms and conditions corresponding to the desired recording at that particular moment. Consequently, a user may have to forsake recording the desired content to ensure copyright terms are not violated.

SUMMARY

According to one embodiment, a content recording system comprises a digital media recording device to record content. A rights-management module is in electrical communication with the digital media recording device to detect a desired recording performed by the digital media recording device. The rights-management module further communicates digital rights information of a rights-managed content to the digital recording device. The recording of the rights-managed content is performed according to the digital rights information.

According to another embodiment, a content recording system that dynamically negotiates terms and conditions of rights-managed content includes a digital media recording device configured to record a desired content located a recording location. The system further includes a location module configured to determine location information of the recording location. A content identifier module in electrical communication with the location module determines whether the desired content is a right-managed content based on the location information. A negotiation module is in electrical communication with the content identifier module to receive identity information of the right-managed content. The negotiation module is configured to communicate at least one condition of the right-managed content to the digital media recording device prior to recording the right-managed content.

In yet another embodiment, a digital media recording apparatus includes a content recording module configured to record a rights-managed content. A communication module is configured to wirelessly communicate with a rights-management module to receive at least one condition corresponding to the rights-managed content. The content recording module is configured to record the rights-managed content according to the at least one condition.

In still another embodiment, a method of negotiating a rights-managed recording event comprises determining a content to be recorded, and determining whether the content is a rights-managed content. The method further includes alerting to at least one condition at in response to determining the content is a rights-managed content. The method further includes performing a recording of the rights-managed content according to the at least one condition.

Additional features are realized through various embodiments. Other embodiments are described in detail herein and are considered a part of the claimed invention. For a better understanding of the embodiments and the features, refer to the description and to the drawings.

BRIEF DESCRIPTION OF THE SEVERAL VIEWS OF THE DRAWINGS

The subject matter described herein is particularly pointed out and distinctly claimed in the claims at the conclusion of the specification. The forgoing and other features of the various embodiments are apparent from the following detailed description taken in conjunction with the accompanying drawings in which:

DETAILED DESCRIPTION

Figure 1:
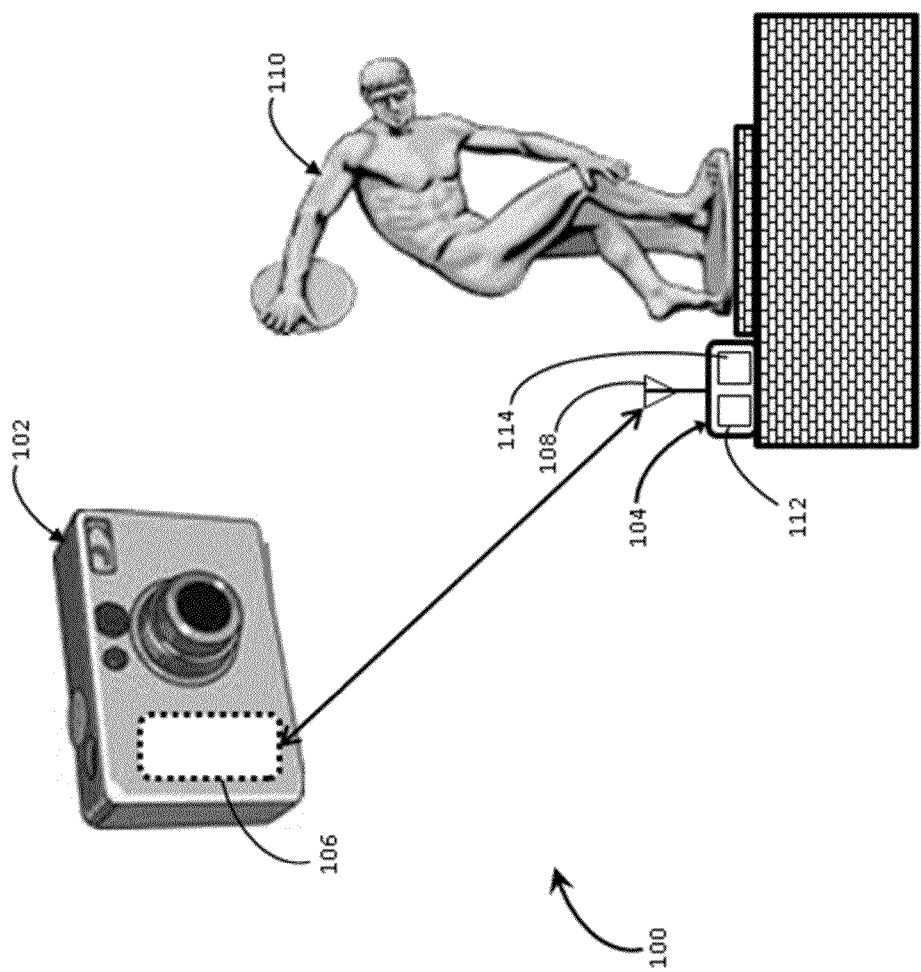
FIG. 1 illustrates a peer-to-peer digital content recording system according to an embodiment.

Referring now to FIG. 1, a content recording system 100 is illustrated according to at least one embodiment. Although the content recording system 100 is illustrated as a peer-to-peer system, the content recording system 100 is not limited thereto. The content recording system 100 includes a digital media recording device 102 and a rights-management module 104. The digital media recording device 102 includes various recording devices capable of recording content as known in the art. For example, the digital media recording device 102 may include, but not limited to, a digital camera, a digital camcorder, a digital sound recorder, cellular telephone, a personal digital assistant (PDA) device, a personal computer (PC), a laptop computer, and a tablet computer. The digital media recording device 102 may record various forms of content. For example, the digital media recording device 102 may record a still-image and/or moving image of a desired content such as, for example, an object, a person, or a scene. In addition, the digital media recording device 102 may record a sound including, but not limited to, music and voices.

The digital media recording device 102 may include an image capture unit to capture desired content, and a controller to initiate and/or confirm recording authorization. The digital media recording device 102 may further include a communication module 106 having a transmitter and/or receiver that allows the digital media recording device 102 to communicate wirelessly. The communication module 106 may utilize various wireless protocols to achieve wireless communication including, but not limited to, Wi-Fi, radio frequency (RF) and Bluetooth.

The rights-management module 104 may include a transmitter 108, which allows the rights-management module 104 to wirelessly communicate with one or more digital media recording device 102 according to various wireless communication protocols including, but not limited to, Wi-Fi, radio frequency (RF) and Bluetooth. In at least one embodiment, the rights-management module 104 may detect a desired recording of a rights-managed content 110 and may wirelessly communicate digital rights information of the rights-managed content 110 to the digital media recording device 102.

The digital media recording device 102 may also detect a notification signal broadcast by the rights-management module 104. In response to detecting the notification signal, the digital media recording device 102 may request the digital rights information from the rights-management module 104. Upon receiving the request, the rights-management module 104 sends the digital rights information to the digital media recording device 102. The digital media recording device 102 may also utilize a quick response (QR) code formed on the rights-managed content 110. In response to scanning the QR code, the digital rights information may be transmitted to the digital media recording device 102 by a remotely located server storing the digital rights information. The server may include, for example, a cloud server, as discussed in greater detail below. Although the rights-management module 104 is illustrated as being coupled to the rights-managed content 110, the system 100 is not limited thereto.

Further, a software application may be utilized to initiate communication between the digital media recording device 102 and the rights-management module 104. For example, embedded code may be pre-stored on the digital media recording device 102, or a third-party software application, i.e., "app", may be downloaded by a user and stored on the digital media recording device 102.

Upon a successfully negotiation of terms and conditions between the digital media recording device 102 and the rights-management module 104, the rights-management module 104 may communicate information informing the content provider of the successful negotiation and recording. For example, the rights-management module 104 may transmit a message to the content provider which states, "three-hundred people recorded your content today."

The digital rights information may include various types of information associated with the rights-managed content 110. For example, the digital rights information may include, but is not limited to, the name of the rights-managed content 110, the name of the content provider, and one or more terms and conditions associated with the rights-managed content 110. The terms and conditions may include, but are not limited to, payment terms, image quality conditions, sound quality conditions and usage conditions associated with a recording of the rights-managed content 110. One or more terms and conditions may be dynamically negotiated using the digital media recording device 102, and the rights-managed content 110 may be recorded based on whether the terms and conditions are accepted or declined, as discussed in greater detail below.

Referring further to FIG. 1, at least one embodiment of the recording system 100 may include a content identifier module 112 in electrical communication with a negotiation module 114. Although the content identifier module 112 and the negotiation module 114 are illustrated as each being integrated with the rights-management module 104 and coupled to the rights-managed content 110, the system 100 is not limited thereto. The content identifier module 112 is configured to detect a desired recording of a desired content and to determine whether the desired content is a right-managed content. The content identifier module 112 may detect a desired recording in various manners. For example, the content identifier module 112 may detect a recording signal broadcast by the digital media recording device 102 in response to manipulation of a recording button. In another embodiment, the digital media recording device 102 may broadcast the recording signal after the digital media recording device 102 performs an auto-focus on the desired content. The recording signal may include, but is not limited to, the type of desired recording (e.g., video, photograph, sound recording), recording device specifications, time of day and/or location information such as Global Positions Satellite (GPS) coordinates. If the desired content is determined to be a right-managed content, the content identifier module 112 may generate an identification (ID) signal, which identifies the right-managed content. The ID signal may provide information including, but not limited to, a name of the right-managed content, global position satellite (GPS) coordinates of the right-managed content, and other information that identifies the right-managed content.

The negotiation module 114 stores digital rights information corresponding to one or more respective rights-managed contents. The negotiation module 114 receives the ID signal from the content identifier module 112, and communicates the digital rights information of the rights-managed content 110 to the digital media recording device 102. The digital rights information may include one or more terms and conditions including, but not limited to, payment terms, image quality conditions, sound quality conditions, usage rights of a recorded rights-managed content, and usage duration of a recorded rights-managed content.

The payment terms may include payment of a royalty fee in exchange for authority to record the rights-managed image. The image quality condition may include granting permission to record the rights-managed content at different resolutions. For example, authorization to record content at a lower image resolution may be granted without payment of a fee, whereas agreeing to pay a royalty fee grants authorization to record the rights-managed content at a higher resolution. In addition, image quality condition may include requiring a watermark be overlaid on a recording of the rights-managed content. The sound quality condition may be similar to the image quality condition. For example, authorization to record content at a lower fidelity may be granted without payment of a fee, whereas agreeing to pay a royalty fee grants authorization to record the rights-managed content at a higher fidelity. In addition, the sound quality condition may require a sound overlay be included in a recording of the rights-managed sound, which gives credit to the rights-managed content source provider. The usage rights of a recorded rights-managed content may include limitations to reproduction, distribution, broadcastings, adaptations/variations, and sale of the recorded rights-managed content. Additionally, the usage rights may require a content provider's name or source be embedded in the digital file as metadata. The usage duration of a recorded rights-managed content may allow recording of a limited duration of the rights-managed content, such as a limited recording duration of a sound, while payment of a royalty fee grants authorization to record an entire duration of the rights-managed content.

In at least one embodiment, accepting the terms and conditions, e.g., agreeing to pay royalty fees, causes the digital recording apparatus to operate in a first mode, while declining the terms and conditions causes the digital media recording apparatus to operate in a second mode. The first mode may record the rights-managed content according to high image quality, high sound quality, or no restrictions whatsoever. The second mode, however, may record the rights-managed content at low image quality, a low sound quality, or may prohibit recording of the digital-rights managed content all together. In another embodiment, the digital rights information may include one or more terms and conditions that must be accepted before authorization to record the rights-managed content is granted.

According to an embodiment illustrated in FIG. 1, the content identifier module 112 communicates the ID signal to the negotiation module 114. In response to receiving the ID signal, the negotiation module 114 determines the digital-rights information corresponding to the rights-managed content 110 indicated by the ID signal, and transfers the digital rights information to the digital media recording device 102. In addition, the negotiation module 114 may transmit a digital rights key or password to verify that permission to record rights-managed content has been granted. Accordingly, the digital media recording device 102 may alert the user of the digital rights information received from the negotiation module 11, thereby allowing the user to dynamically obtain proper authorization to record the rights-managed content 110.

Figure 2:
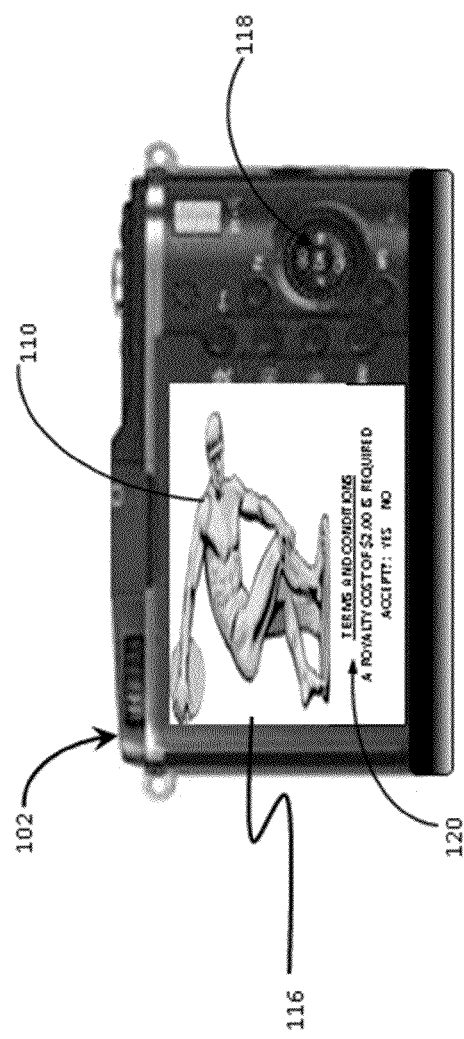
FIG. 2 illustrates a digital content recording device according to at least one embodiment.

More specifically, the digital media recording device 102 may include a user interface (UI) 116 and one or more selection keys 118, as illustrated in FIG. 2. The UI 116 may display data including, but not limited to, a digital image of a desired content to be recorded, menus of the digital media recording device 102, status information of the digital media recording device 102, and one or more alerts. If the desired content to be recorded is a rights-managed content 110, the UI 116 may display digital rights information, such as terms and conditions 120, corresponding to the rights-managed content 110. The digital rights information may be displayed in a message area, or may overlay the digital content displayed by the UI 116. The selection key 118 may input one or more selections to the UI 116. In at least one embodiment, the selection key 118 may input a selection that accepts or declines the terms and conditions 120. The digital media recording device 102 may then record the rights-managed content 110 based on the selection. For example, if the user accepts to pay royalty fees in exchange for a higher-quality image, the digital media recording device 102 may record the rights-managed content 110 at a higher resolution, e.g., 2240×1680. However, if the user declines payment of royalty fees, the digital media recording device 102 may record the rights-managed content 110 at a lower resolution, e.g., 256×256, or may prevent recording the image all together. Accordingly, a user is dynamically informed of right-managed contents and is provided the opportunity to obtain proper authorization to record the rights-managed content.

Figure 3:
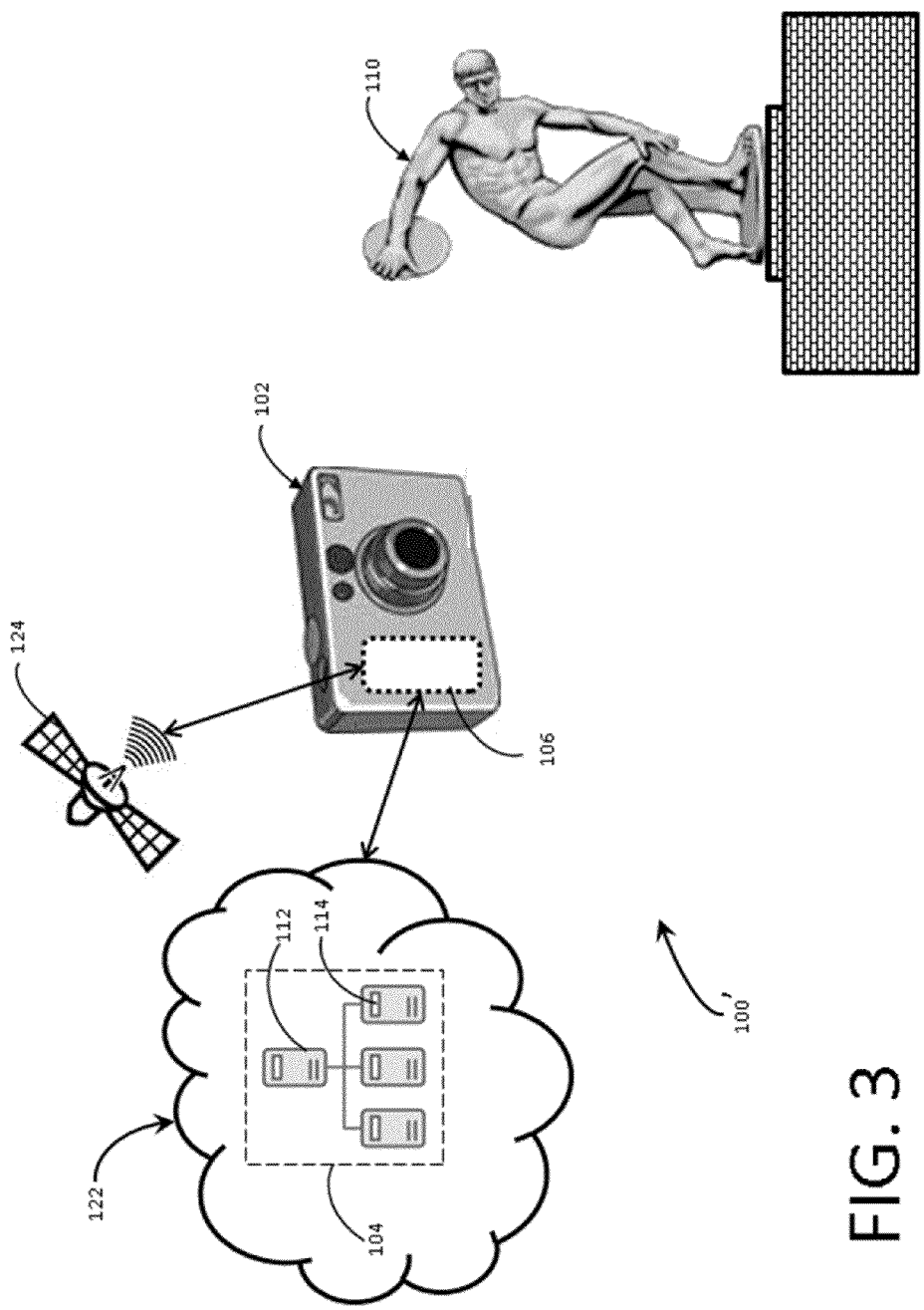
FIG. 3 illustrates a cloud-based digital content recording system according to an embodiment.

Referring now to FIG. 3, a cloud-based content recording system 100' is illustrated according to an embodiment. The cloud-based content recording system 100' is similar to the content recording system 100 described in detail above. The cloud-based content recording system 100' includes a digital media recording device 102 having a communication module 106 to receive digital rights information corresponding to a rights-managed content 110. However, instead of the rights-management module 104 being located at the rights-managed content 110, the rights-management module 104 is located at a cloud server 122. The cloud server 122 may comprise a server network that includes the content identifier module 112 and the negotiation module 114. Accordingly, the digital media recording device 102 may obtain digital rights information without wirelessly communicating directly with the rights-managed content 110.

The cloud server may include one or more cloud computing nodes, which may also communicate with other cloud computing nodes. The cloud computing nodes may be grouped (not shown) physically or virtually in one or more networks, such as Private, Community, Public, or Hybrid clouds, as described hereinabove, or a combination thereof. This allows the cloud server to offer infrastructure, platforms, and/or software as services for which a cloud consumer does not need to maintain resources on a local computing device. It is understood that the types of electronic devices and machines described herein are intended to be illustrative only and that the one or more computing nodes and the cloud server may communicate with any type of computerized device and machine over any type of network and/or network addressable connection (e.g., using a web browser). Program code located on one of cloud computing nodes may be stored on a computer recordable storage medium in one of cloud computing nodes and downloaded to a computing device within the computing devices and machines over a data network, for example a wireless communication network, for use in these computing devices. For example, a cloud server connected to one or more cloud computing nodes may store program code on a computer readable storage medium on the server computer. The cloud server computer may download the program code to a client computer at the computing devices and machines in electrical communication with the data network for use on the client computer.

More specifically, the digital media recording device 102 may determine location information of the digital media recording device 102, i.e., a recording location. In at least one embodiment illustrated in FIG. 3, the communication module 106 of the digital media recording device 102 may communicate with a Global Positioning Satellite (GPS) system 124 to determine GPS coordinates of the digital media recording device 102. Once the GPS coordinates are obtained, the communication module 106 may communicate with the cloud server 122 to send the GPS coordinates to the content identifier module 112. The content identifier module 112 may store GPS coordinates of one or more rights-managed content. The content identifier module 112 may compare the GPS coordinates received from the digital media recording device 102 with the stored GPS coordinates to determine whether the recording location of the digital media recording device 102 includes a rights-managed content 110. For example, if the coordinates match, the content identifier module 112 may determine that the digital media recording device 102 is attempting to record the right-managed content rights-managed content 110 corresponding to the stored GPS coordinates.

In another example, although the GPS coordinates may not match exactly, the content identifier module 112 may determine that the GPS coordinates of the digital media recording device 102 are in close range with stored GPS coordinates corresponding to a rights-managed content. The content identifier module 112 may then communicate with the negotiation module 114 to obtain ID information, such as a name, image, etc., of the rights-managed content 110, and send the ID information to the digital media recording device 102. A user may then manipulate the selection key 118 to confirm the rights-managed content 110 displayed by the UI 116 is the desired content to be recorded. In response to the confirmation, the negotiation module 114 may communicate the digital rights information of the rights-managed content 110 to the digital media recording device 102, which may be alerted by the UI 116 accordingly.

In another example, the GPS coordinates of the digital media recording device 102 may match stored GPS coordinates stored by the content identifier module 112, which correspond to a museum that applies one or more conditions to the contents displayed therein. Based on the matching GPS coordinates, the content identifier module 112 may obtain the digital-rights information of the museum and send the digital rights information to the digital media recording device 102 which may be displayed as described in detail above.

Figure 4:
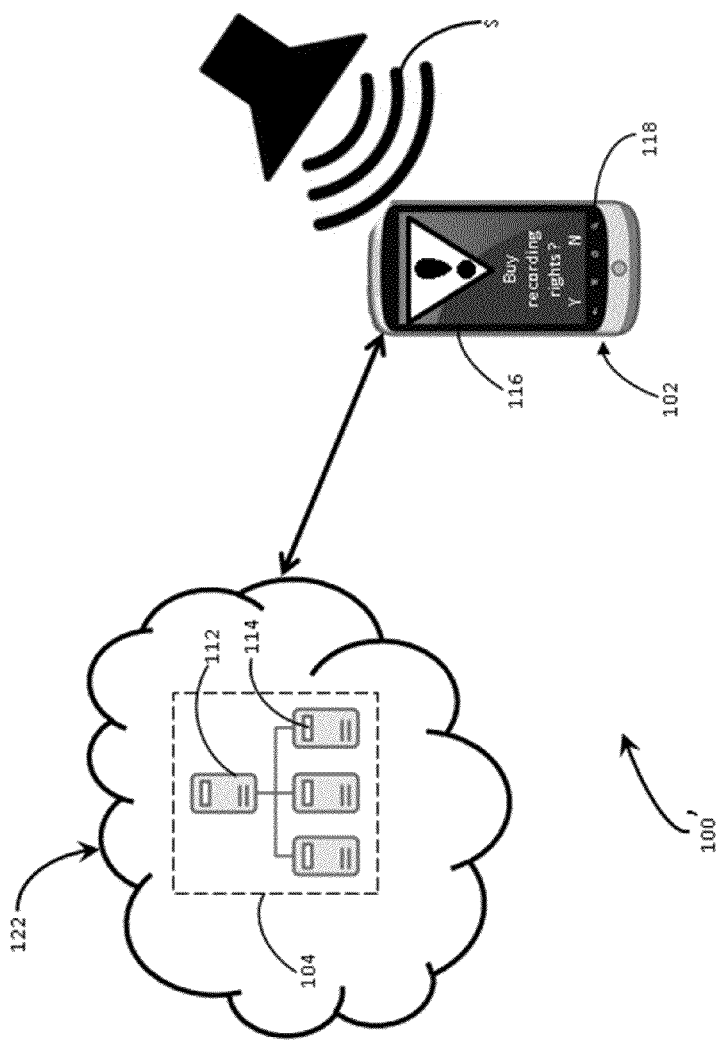
FIG. 4 illustrates a cloud-based digital content recording system according to another embodiment.

Referring now to FIG. 4, the cloud-based content recording system 100' may be applicable to recordings of audio rights-managed content, such as musical sound recordings. Similar to the cloud-based content recording system 100', a digital media recording device 102, such as a smart phone, may detect a sound (S) that a user would like to be recorded. In response to detecting the sound (S), the digital recording device may communicate the sound (S) to the cloud server 122. The content identifier module 112 may be stored with one or more rights-managed sound recordings, and may compare the sound (S) to the stored sound recordings. If the sound (S) matches a stored sound recording, the content identifier module 112 may generate an ID signal that identifies the sound (S). The negotiation module 114 receives the ID signal, and communicates the digital rights information corresponding to the sound (S) to the digital media recording device 102. Accordingly, the digital rights information, including one or more conditions such as a royalty fee, may be displayed on the UI 116. In addition, the digital media recording device 102 may alert the user that the sound is a right-managed sound. The alert may include, for example, an icon, a sound, a light, and/or a vibration. The user may manipulate a selection key 118 to either accept or deny the one or more conditions, and the digital media recording device 102 may operate based on the user's selection. For example, if the user accepts to pay a royalty fee in exchange, the digital media recording device 102 may record the sound (S) at a higher sound quality, e.g., a high-fidelity (hi-fi) recording. However, if the user declines payment of the royalty fee, the digital media recording device 102 may record the sound (S) at a lower sound quality, e.g., lo-fi, or may prevent recording the sound (S) all together.

Figure 5:
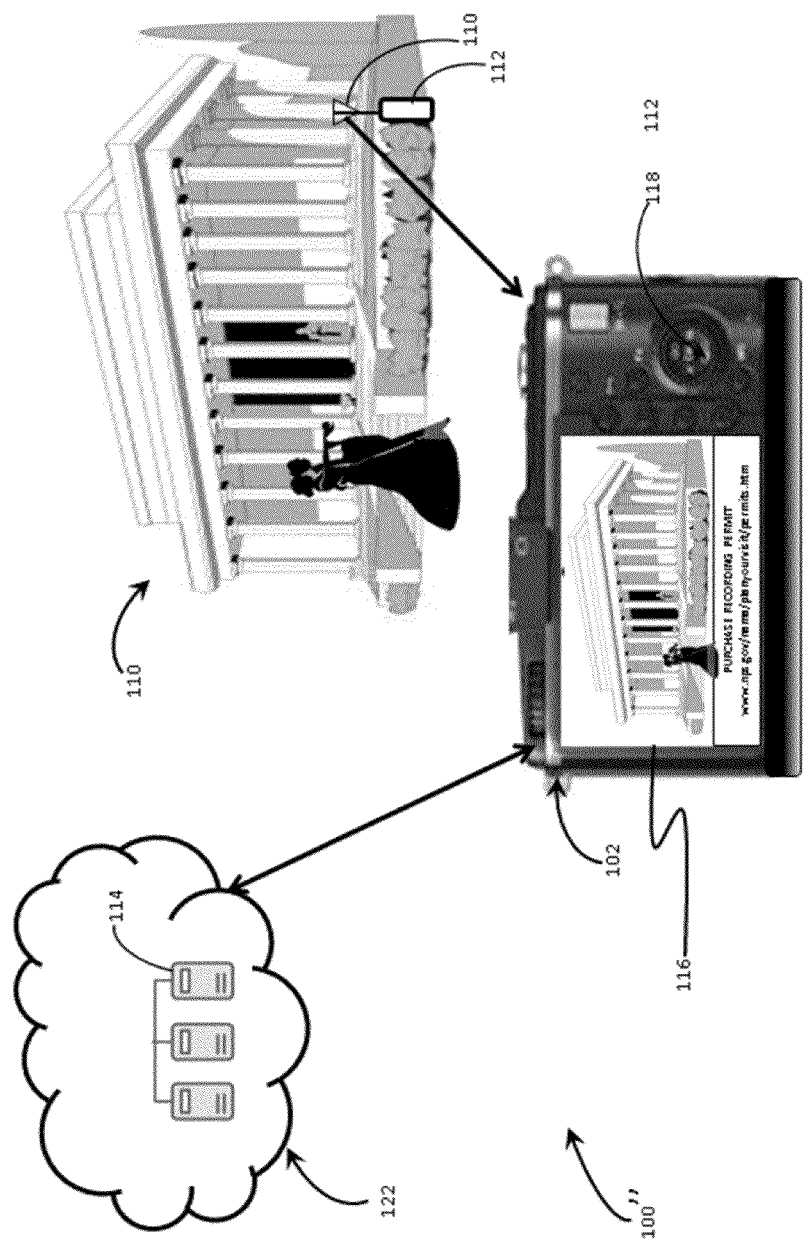
FIG. 5 illustrates a hybrid peer-cloud digital content recording system according to an embodiment.

Referring now to FIG. 5, a hybrid peer-cloud digital content recording system 100" is illustrated according to an embodiment. The hybrid peer-cloud digital content recording system 100" is similar to the content recording systems 100, 100' described in detail above. The hybrid peer-cloud digital content recording system 100" includes a digital media recording device 102 having a communication module 106 to electrically communicate the content identifier module 112 and/or the negotiation module 114. However, the content identifier module 112 and the negotiation module 114 are located remotely from one another. In an embodiment illustrated in FIG. 5, the content identifier module 112 may be located near a rights-managed content 110, while the negotiation module 114 is located at a cloud server 122. In this case, the content identifier module 112 may include a transmitter 110 to communicate with the digital media recording device 102. The content identifier module 112 may detect a desired recording event, and may transmit digital rights information to the digital media recording device 102.

In at least one embodiment illustrated in FIG. 5, the rights-managed content 110 may include rights-managed content 110 that requires the user of the digital recording device 102 to obtain a recording permit authorizing recording of the rights-managed content 110. In response to detecting a recording event, the content identifier module 112 may transmit ID information and/or digital rights information to the digital media recording device 102. The information may include a URL address which directs the user of the digital media recording device 102 to a website where the user may purchase the permit. Upon payment, the digital media recording device 102 may communicate with the cloud server 122 to receive an electronic copy of the permit stored in the negotiation module 114. Accordingly, recording permits authorizing permission to record the rights-managed content 110 may be dynamically obtained such that desired recordings may be performed.

Figure 6:
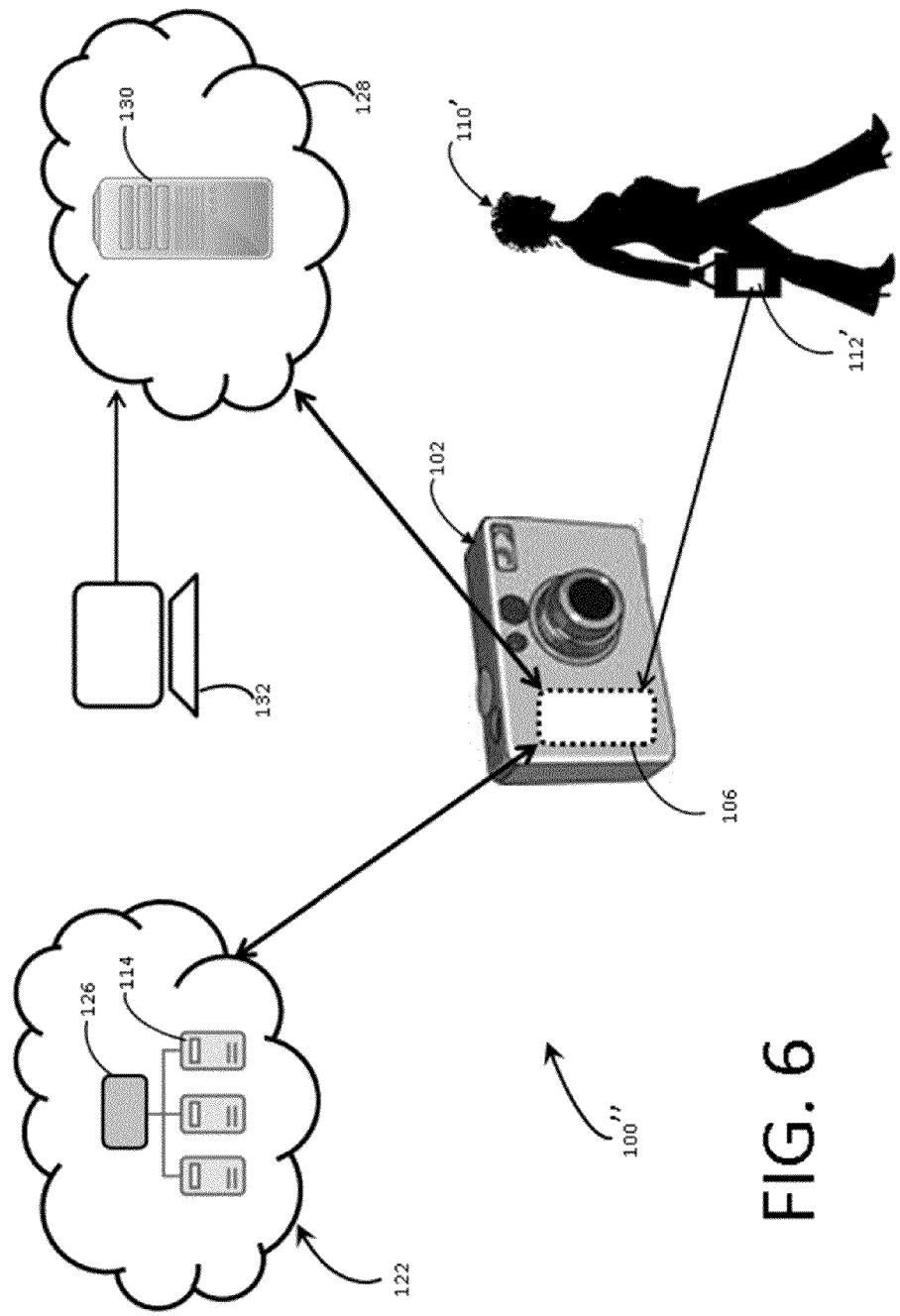
FIG. 6 illustrates a hybrid peer-cloud hybrid digital content recording system according to another embodiment.

Referring now to FIG. 6, another embodiment of a hybrid peer-cloud digital content recording system 100" is illustrated. The hybrid peer-cloud digital content recording system 100" of FIG. 6 operates as discussed above. However, the content identifier module 112 is formed as a radio-frequency identification (RFID) module 112' capable of communicating with the communication module 106 of the digital media recording device 102. The RFID module 112' is a wireless non-contact system that uses radio-frequency electromagnetic fields to transmit data. The RFID module 112' may be sized extremely small, for example about 10 millimeters (mm) to about 20 mm, such that the RFID module 112' may be conveniently possessed by a person 110', such as located in a purse, wallet, pocket, etc.

Referring further to FIG. 6, a person 110' may register the RFID module 112' and digital rights information with a service provider operating the cloud server 122. A user of the digital media recording device 102 wishing to record the person 110' possessing the RFID module 12' may receive ID information and/or digital rights information form the RFID module 112' when attempting to perform a recording. The ID information and/or digital rights may be displayed by the UI 116 of the digital media recording device 102 and the user may decide to accept or decline one or more conditions as described in detail above. Although not shown in detail, the system 100" may further leverage the GPS system 124 to determine location information of the digital media recording device 102 and/or the RFID module 112', which may be further used to determine digital rights information of the person 110' possessing the RFID 112'. Although the RFID module 112' is described as being possessed by a person 110', it can be appreciated that the RFID module 112' may be coupled to various objects, such as art work, consumer goods, or other objects subject to digital recording rights.

The system 100" may further include an ID confidence module 126. Although the ID confidence module 126 is shown to be connected to the negotiation module 114 at the cloud server 122, the ID confidence module 126 may also be in electrical communication with the digital media recording device 102 and/or a content identifier module 112, such as the RFID module 112'. The ID confidence module 126 is configured to determine a confidence level corresponding to a likelihood that the desired content displayed the UI 116 of the digital media recording device 102 is a right-managed content. The confidence level may receive the ID information transmitted from the RFID module 112', or additional ID information including, but not limited to, an image, a name, and a voice-input, background images, location information and sound. Accordingly, the ID confidence module 126 may compare the ID information provided by the user and/or RFID module 112' to the stored ID information to determine the confidence level. For example, a user may provide the ID confidence module 126 with an image of the person 110' to be recorded. The ID confidence module 126 may perform a pattern-recognition, such as comparing the image of the person provided by the user with a pre-stored image of the person 110' possessing the RFID module 112'. If the images match, the ID confidence module 126 may generate a confidence level signal that indicates a likelihood that digital rights information, such as royalty fees, distribution conditions, etc., are associated with the person 110'. The confidence level may be displayed on the UI 116 of the digital media recording device 102 in various forms including, but not limited to, an icon and text.

The confidence level may also be compared to a threshold level. When confidence level exceeds the threshold level, it is determined that the desired content is a rights-managed content. Accordingly, digital rights information corresponding to the rights-managed content may automatically be sent to the digital media recording device and automatically presented by a user interface.

The confidence level may also be utilized to determine whether a rights-managed content 110 detected by the digital media recording device 102 is in fact a correct rights-managed content 110' to be recorded. For example, if a location has a plurality of rights-managed contents, a confidence level may indicate to a user that a first rights-managed content 110 detected by the digital media recording device 102 is not the correct rights-managed content 110' the user desires to record. Accordingly, the user may re-execute the detection process in an attempt to detect the correct rights-managed content 110'. In another example, if the desired content is a sound, the ID confidence module 126 may provide the user with a sound sample to allow the user to confirm that the rights-managed content determined by the content identifier module 112 is correct rights-managed content which the user would like to pay royalty fees. Although the ID confidence module 126 is described in association with the system 100", it can be appreciated that the ID confidence module 126 may be implemented in the system 100 and the system 100' described in detail above.

Still referring to FIG. 6, the communication module 106 of the digital media recording device 102 may electrically communicate with a personal cloud server 128. The personal cloud server 128 may include data server 130 that stores one or more applications including, but not limited to, spread sheet applications, data organization applications, email applications, social networking applications, image/sound editing applications, calendar applications, or other graphical user interfaces. The personal cloud sever 128 may be accessed by a personal computing device 132, such as a personal computer, a laptop computer, a tablet computer, a PDA, and/or a smart phone.

Figure 7:
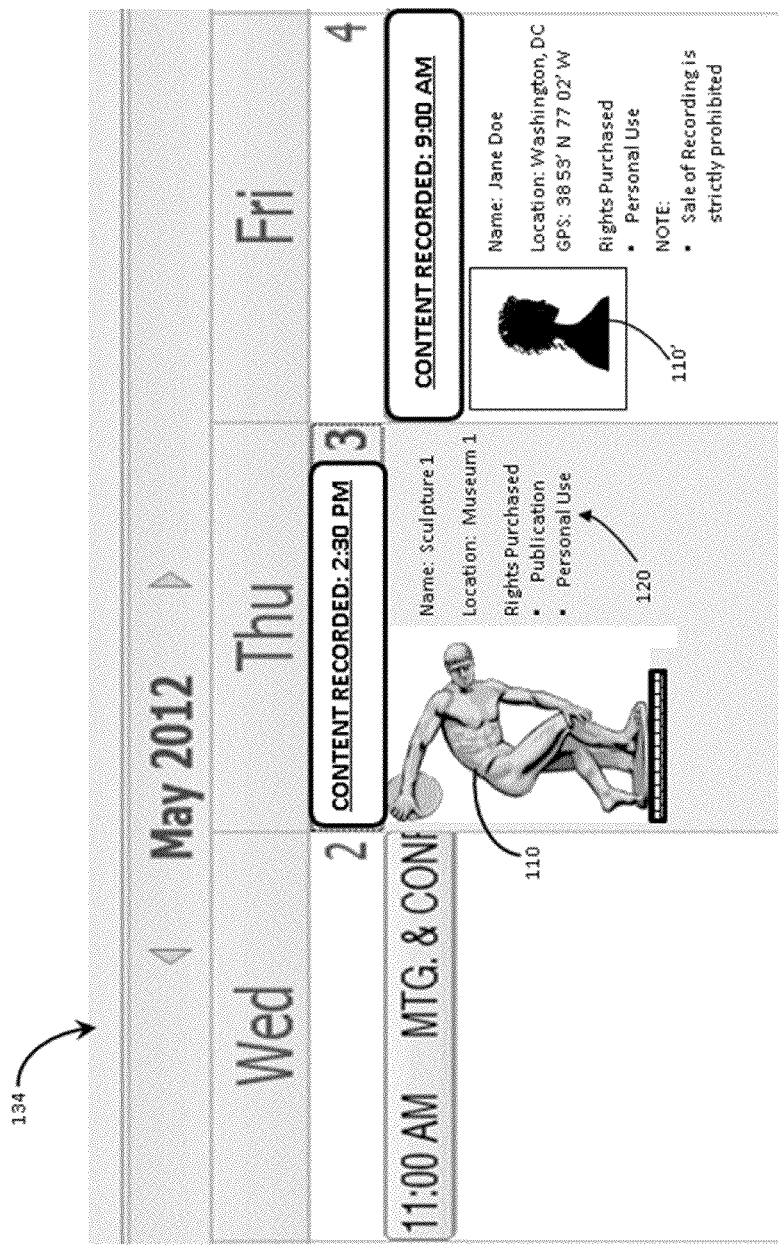
FIG. 7 illustrates a digital content recording system including a dynamic electronic calendar showing terms and condition information of a recorded content according to an embodiment.

Referring now to FIG. 7, an electronic calendar application 134 stored on a data server 130 of the personal cloud server 128 is illustrated according to at least one embodiment. The calendar application 134 may automatically be updated with recording information corresponding to one or more recorded rights-managed contents, and may conveniently display the information as calendar entries. The recording information includes, but is not limited to, the name of the recorded content, location information where the rights-managed content was recorded, an image of the recorded content, one or more rights obtained during the recording of the rights-managed content and one or more notifications indicating restrictions of using the recorded content. For example, an annotation of "Content Recorded: Thursday, May 3, 2:30 pm; Location: Museum 1; Rights Purchased: Publication, Personal Use" maybe stored in the calendar application 134.

A user may also access the calendar 134 using the personal computing device 132, without using the digital media recording device 102. The personal computing device 132 may allow a user to edit the calendar 134 and/or the recording information. In addition, other users may optionally share their electronic calendar content information to others via email and/or social network site allowing for possible collaborations, rights discussions, remuneration, etc. Accordingly, a user may conveniently track their recorded rights-managed content and the corresponding rights obtained.

In another embodiment, the system may be implemented in a virtual universe (VU). A VU is a computer-based simulated environment through which users can interact with one another and use and create virtual objects, i.e., virtual content. A VU includes various interactive 3D virtual environments, where users may take the form of avatars visible to others. These avatars usually appear as textual, two-dimensional, or three-dimensional representations, although other forms are possible. In addition to creating avatars, VUs allow for the creation of virtual content, such as virtual art, virtual sculptures, virtual designs, sound, etc., which exist in the VU.

The VU is typically implemented as a software application stored on a VU simulation server. A user may connect to the VU simulation server using various computing devices including, but not limited to, a PC, a laptop computer, a tablet computer and a smart phone. Once connected, the computing device may display the VU on a user interface (UI), and manipulate the VU using one or more input keys.

The computing device is capable of recording one or more virtual contents displayed on the UI. In addition, computing device may record entire screen shots of the VU displayed on the UI. Since the VU allows users to create VU content that is displayed to other users existing in the VU, it can be appreciated that users may desire to assign one or more recording rights to their VU content. That is, users of the VU may wish to subject their created VU content to digital recording rights. Accordingly, users may register their VU content and corresponding digital recording information with VU service provider.

The digital recording systems described in detail above may be implemented in the VU environment. The rights-management module 104 may be included in the VU simulation server that hosts the VU, and may detect an attempted recording operation performed by a personal computing device connected to the VU simulation server. The VU simulation server may detect the content to be recorded in various manners including, but not limited, determining a location of an avatar with respect to registered VU content, or detecting data manipulation, e.g., copying/downloading operation, of a registered VU content. In response to determining that an attempted recording includes a VU rights-managed content, the VU simulation server may display ID information and/or digital rights information on the UI of the computing device. A user of the computing device may accept or decline the terms and conditions, and the recording of the VU rights-managed content may be performed as described in detail above. In addition, the VU server may control the recorded appearance of one or more VU contents. For example, a VU rights-managed content may be blurred, or substitute content, for example generic clothing, maybe is substitute for the VU rights-managed content for recording purposes.

Figure 8:
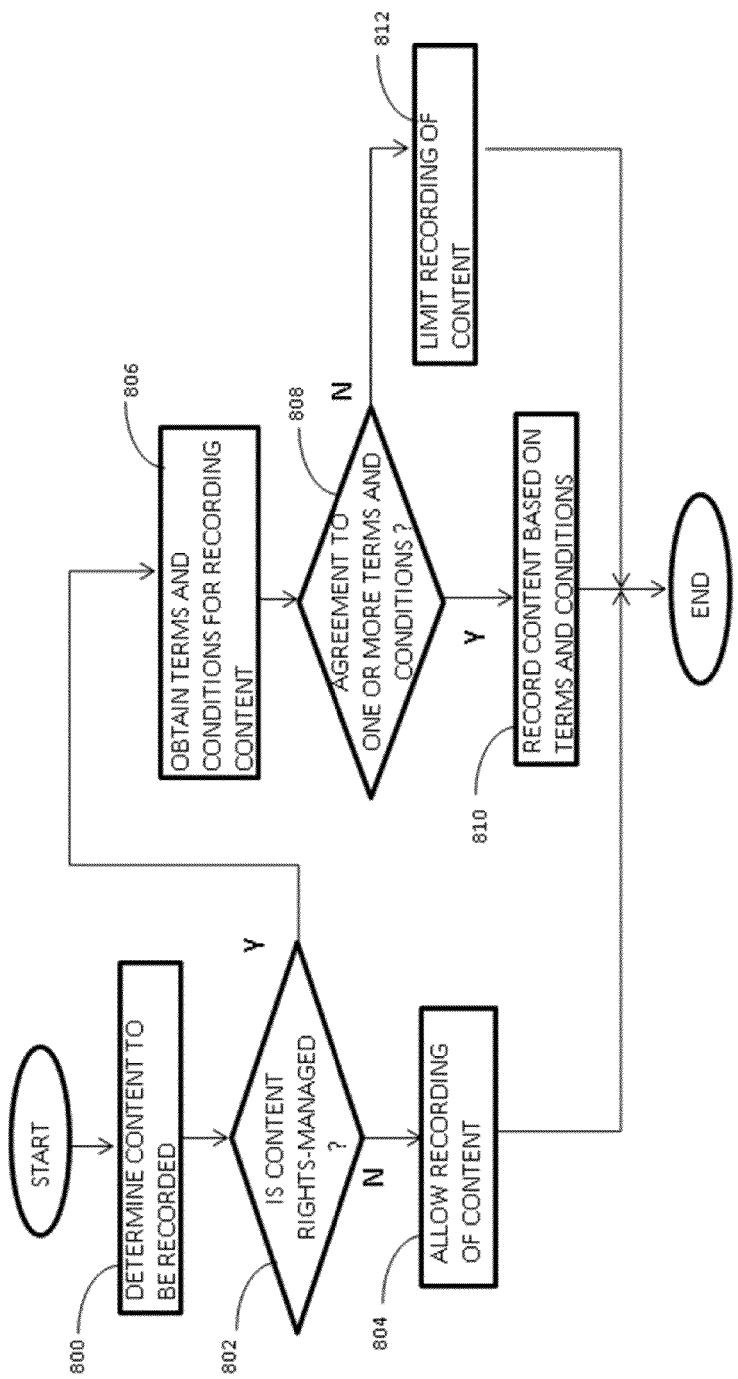
FIG. 8 is a flow diagram illustrating a digital content recording system to dynamically negotiate terms and conditions of rights-managed content according to at least one embodiment.

Referring now to FIG. 8, a flow diagram illustrates a digital content recording system to dynamically negotiate terms and conditions of a rights-managed content according to at least one embodiment. At operation 800, a desired content to be recorded is determined. For example, a user may discover a content of interest and may capture the desired content in a view finder of a user interface. Once the desired image is displayed in the view finder, the user may manipulate a recording button to attempt a recording process. In at least one embodiment, the recording device may transmit a recording signal indicating an attempt to record the desired content. At operation 802, a determination is performed as to whether the desired content to be recorded is a rights-managed content. If the desired content is not a rights-managed content, the recording device records the desired contents at operation 804, and method ends.

However, if the desired content is a rights-managed content, the recording device obtains terms and conditions for recording the rights-managed content at operation 806. In at least one embodiment, a rights-management module may detect the recording signal transmitted by the recording device, and may respond by transmitting ID information and/or digital rights information to the recording device. The recording device may then alert the user that the desired content is a rights-managed content. The user may be alerted in various ways including, but not limited to, outputting a sound, vibrating the recording device and/or displaying one or more terms and conditions on a user interface. At operation 808, a user may agree or decline the terms and conditions. In at least one embodiment, the user may utilize a user interface of the recording device to input an accept command that accepts the terms and conditions, or a decline command that declines the terms and conditions. If the user accepts the terms and conditions, the rights-managed content is recorded accordingly at operation 810, and the method ends. If the user declines the terms and conditions, however, the a limited recording of the rights-managed content is performed, or the recording of the rights-managed content may prevented all together at operation 812, and the method ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments have been presented for purposes of illustration and description, but is not intended to be exhaustive or limited to the invention in the form disclosed. Many modifications and variations will be apparent to those of ordinary skill in the art without departing from the scope and spirit of the embodiments. Various embodiments have been described in order to explain the inventive principles and the practical applications, and to enable others of ordinary skill in the art to understand the features of the various embodiments with various modifications, as are suited to the particular use contemplated.

The flow diagrams depicted herein are just one example. There may be many variations to this diagram or the steps (or operations) described therein without departing from the spirit of the embodiments. For instance, the steps may be performed in a differing order or steps may be added, deleted or modified. All of these variations are considered a part of the claimed invention.

While various embodiments have been described, it will be understood that those skilled in the art, both now and in the future, may make various modifications which fall within the scope of the claims which follow. These claims should be construed to maintain the proper protection of the described invention.

What is claimed is:

1. A content recording system, comprising:
    a digital media recording device to visually record a desired content; and
    a rights-management module located in a vicinity of desired content and coupled directly to the desired content and wirelessly connected to the digital media recording device to communicate digital rights information directly from the desired content to the digital recording device prior to capturing the desired content when the desired content is a rights-managed content, the digital media recording device configured to record the rights-managed content according to the digital rights information,
    wherein the rights-management module comprises:
        a content identifier module in electrical communication with the digital media recording device, the content identifier module configured to detect a desired recording of the desired content and to determine whether the desired content is the rights-managed content; and
        a negotiation module in electrical communication with the content identifier module and the digital media recording device, the negotiation module configured to determine at least one recording condition included with the digital rights information and to communicate the at least one condition to the digital media recording device in response to determining the rights-managed content,
    wherein the negotiation module receives accepted terms and condition data satisfying the at least one condition, and wherein the digital media recording device records the desired content that is a rights-managed content in response to receiving the accepted terms and conditions data,
    wherein the digital media recording device includes a user interface configured to display the digital rights information, and
    wherein the rights-management module comprises a radio-frequency identification (RFID) module coupled to the desired content, the RFID module configured to communicate the digital rights information to at least one of the digital recording device and the content identifier module, and wherein the recording of a desired content by the digital media recording device is performed according to the digital rights information.

2. The content recording system of claim 1, wherein the user interface includes at least one selection key to input an accept command that accepts the at least one condition and to input a decline command that declines the at least one condition.

3. The content recording system of claim 2, wherein the digital media recording device operates in a first mode in response to the accept command and a second mode in response to the decline command, the first mode including one of recording the rights-managed content at a high image quality, or recording the image quality without restrictions, and the second mode including one of recording the rights-managed content at a low image quality less than the high image quality, or preventing recording of the rights-managed content.

4. The content recording system of claim 3, wherein the content identifier module and the negotiation module are coupled to the rights-managed content, each of the content identifier module and the negotiation module configured to wirelessly communicate with the digital recording device.

5. The content recording system of claim 1, wherein the digital rights information includes at least one of location information, content provider information, terms and conditions that control recording of the desired content, a URL address of a server storing terms and conditions of the desired content, and a URL address of server storing a recording permit authorizing recording of the desired content.

6. The content recording system of claim 5, wherein the terms and conditions include at least one of payment terms, image quality conditions, sound quality conditions, and usage rights.

7. The content recording system of claim 1, wherein the digital media recording device is in electrical communication with a virtual simulation server to display a three-dimensional (3D) simulated environment including at least one digital content displayed as a virtual object on the user interface, and wherein the virtual simulation server detects the desired recording of the digital content appearing in the 3D simulated environment, communicates at least one condition to the digital media recording device corresponding to the digital content, and performs the recording of the digital content appearing in the 3D simulated environment according to the at least one condition.

8. A content recording system that dynamically negotiates terms and conditions of rights-managed content, comprising:
 a digital media recording device configured to visually record a desired content located at recording location, the digital media recording device including a user interface configured to display the digital rights information;
 a location module of the digital media recording device configured to determine location information of the recording location prior to capturing the desired content;
 a rights-management module located in the vicinity of the desired content and coupled directly to the desired content and wirelessly connected to the location module, comprising:
  a content identifier module to determine whether the desired content is a rights-managed content based on the location information prior to capturing the desired content; and
  a negotiation module in electrical communication with the content identifier module to receive identity information of the rights-managed content prior to capturing the desired content and to communicate at least one condition of the rights-managed content directly from the desired content to the digital media recording device prior to recording the rights-managed content,
 wherein the negotiation module receives accepted terms and condition data satisfying the at least one condition, and wherein the digital media recording device records the desired content that is a rights-managed content in response to receiving the accepted terms and conditions data, and
 wherein the rights-management module comprises a radio-frequency identification (RFID) module coupled to the desired content, the RFID module configured to communicate the digital rights information to at least one of the digital recording device and the content identifier module, and wherein the recording of a desired content by the digital media recording device is performed according to the digital rights information.

9. The content recording system of claim 8, further comprising an ID confidence module configured to determine a confidence level corresponding to a likelihood that the desired content is a rights-managed content.

10. The content recording system of claim 9, wherein the confidence level is based on at least one of pattern-recognition, color, movement, background, sound, user input information, and location information of the desired content.

11. A digital media recording apparatus, comprising:
 a user interface configured to display the digital rights information;
 a content recording module configured to visually record a desired rights-managed content; and
 a communication module configured to wirelessly communicate with a rights-management module that is located in the vicinity of the desired rights-managed content and coupled directly to the desired rights-managed content, the communication module receiving at least one condition corresponding to the rights-managed content directly from the desired rights-managed content prior to capturing the desired rights-managed content, the content recording module configured to receive accepted terms and condition data satisfying the at least one condition, and to record the rights-managed content according to the at least one condition in response to receiving the accepted terms and conditions data,
 wherein the rights-management module comprises a radio-frequency identification (RFID) module coupled to the desired content, the RFID module configured to communicate the digital rights information to at least one of the digital recording device and a content identifier module, and wherein the recording of a desired content by the digital media recording device is performed according to the digital rights information.

12. The digital media recording apparatus of claim 11, wherein the user interface is configured to display the at least one condition, and includes at least one selection key to input an accept command that accepts the at least one condition and a decline command that declines the at least one condition.

13. The digital media recording apparatus of claim 12, wherein the content recording module stores a record of at least one accepted condition in response to the accept command.

14. The digital media recording apparatus of claim 13, wherein the at least one condition includes at least one of terms and conditions that control recording corresponding to the rights-managed content, a URL address of a server storing terms and conditions of the rights-managed content, and a URL address corresponding to a server that stores a recording permit authorizing recording of the rights-managed content.

15. The digital media recording apparatus of claim 14, wherein the content recording module automatically communicates a recorded rights-managed content and the record of at least one accepted condition to a data server, the data server providing an application that automatically displays information identifying the recorded rights-managed content and the at least one accepted condition in a graphical user interface.

16. The digital media recording apparatus of claim 15, wherein the terms and conditions include at least one of payment terms in exchange for recording authorization, image quality conditions, sound quality conditions, and usage rights of a recorded desired content.

\* \* \* \* \*